United States Patent

[15] 3,656,301

Katz

[45] Apr. 18, 1972

[54] COMPENSATED FEEDBACK GAS TURBINE AUGMENTATION CONTROL SYSTEM

[72] Inventor: Herbert Katz, Cincinnati, Ohio

[73] Assignee: General Electric Company

[22] Filed: Nov. 25, 1969

[21] Appl. No.: 879,794

[52] U.S. Cl..............................60/236, 60/39.28, 60/237, 60/39.16
[51] Int. Cl...........................................F02k 1/16
[58] Field of Search..............60/237, 235, 236, 226, 39.14, 60/39.15, 39.16

[56] References Cited

UNITED STATES PATENTS

| | | | |
|---|---|---|---|
| 2,987,877 | 6/1961 | Torell | 60/236 |
| 3,014,676 | 12/1961 | Arnett | 60/237 X |
| 3,019,604 | 2/1962 | Hall | 60/237 |
| 3,186,165 | 6/1965 | Edkins | 60/226 |
| 3,395,538 | 8/1968 | Borel | 60/239 |
| 3,472,027 | 10/1969 | Snow | 60/236 |
| 3,232,053 | 2/1966 | Rogers | 60/39.16 X |
| 3,517,509 | 6/1970 | Bayati | 60/39.15 X |

Primary Examiner—Clarence R. Gordon
Attorney—Derek P. Lawrence, Thomas J. Bird, Jr., Lee H. Sachs, Frank L. Neuhauser, Oscar B. Waddell and Joseph B. Forman

[57] ABSTRACT

A control system for a gas turbine engine having an augmenter combustion system and a variable area exhaust nozzle. The control system is applicable to both turbofan and to straight turbojet engines. In the turbofan application, a signal generator schedules the exhaust nozzle area as a function of throttle position and augmenter fuel flow as a function of exhaust nozzle area. An error signal generated between desired fan duct mach number and actual fan duct mach number is integrated and applied to both the augmenter fuel rate generator and the exhaust nozzle area generator. In this manner, during steady state operations, the exhaust nozzle position maintains a desired mach number and the throttle lever position maintains augmenter fuel flow rates. During transients, the exhaust nozzle area position controls the augmenter fuel flow. In the turbojet application the fan duct mach number error signal is replaced by a turbine temperature error signal and the system operates essentially as described above.

10 Claims, 2 Drawing Figures

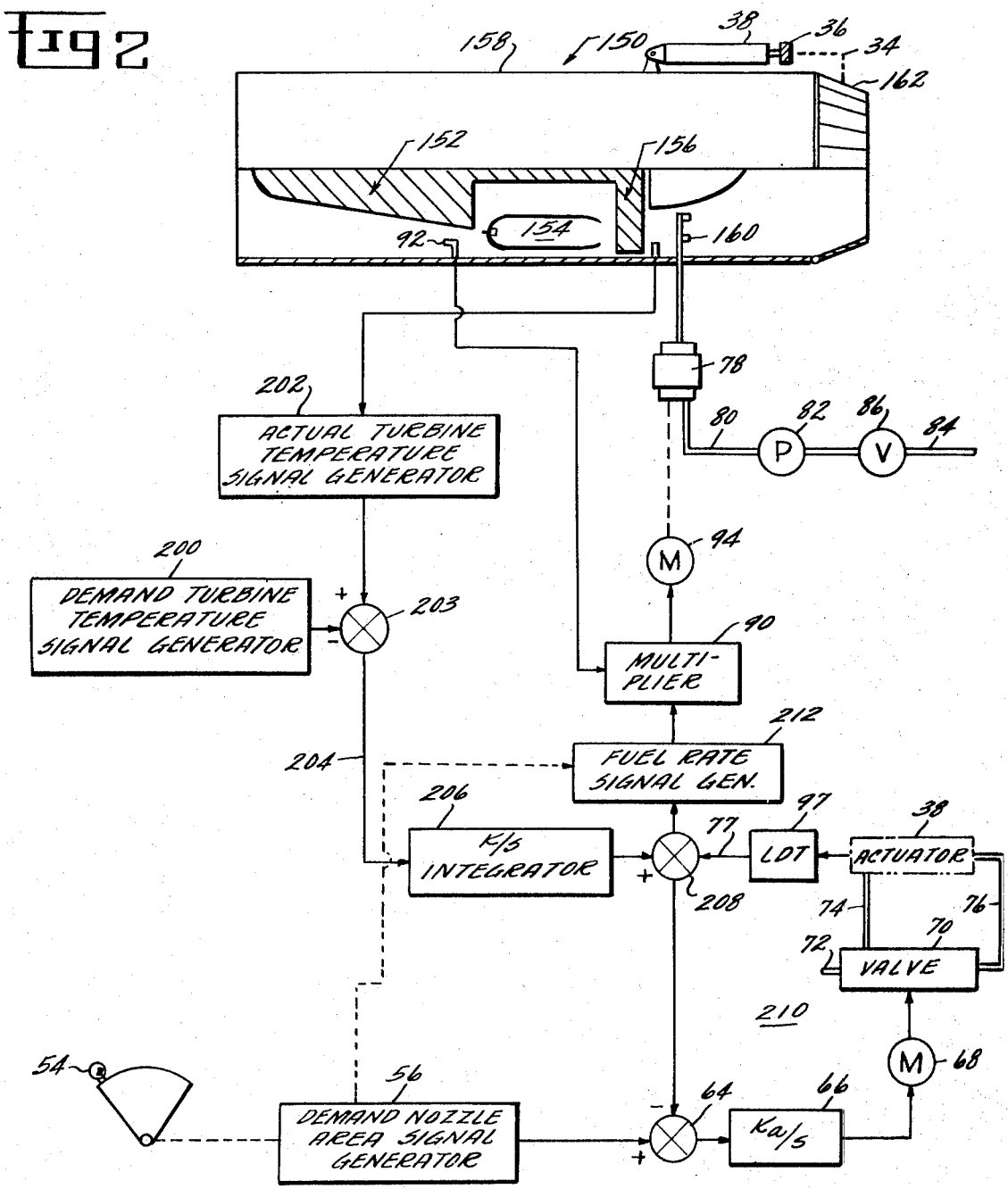

COMPENSATED FEEDBACK GAS TURBINE AUGMENTATION CONTROL SYSTEM

BACKGROUND OF THE INVENTION

This invention relates generally to control systems for augmented gas turbine engines, and more particularly, to control systems for regulating the exhaust nozzle area and the augmentation fuel flow for fan duct burning, mixed flow burning, and afterburning turbojet or turbofan engines.

Axial flow compressors are employed in gas turbine engines to increase the energy level of a hot gas stream generated by such engines and to provide an air stream which may subsequently be discharged through a nozzle to provide a propulsive force. Such compressors generally include a rotor having at least one circumferential row of airfoil shaped blades, with each row of blades employed in combination with a circumferential row of stator vanes also of airfoil cross section. In normal operation, air flows over these blades and is forced axially downstream of the compressor through an annular flow path of diminishing dimension to provide a high energy pressurized air stream. What is generally designated a "stall condition" occurs within the compressor when air flow separates from the airfoil shaped blades or vanes. This results in a loss of pressurization and a resultant loss in energy output from the compressor. One of the prime concerns, therefore, in the operation of gas turbine engines is the prevention of "compressor stall."

One basic type of gas turbine engine, commonly referred to as a turbojet or jet engine, employs an axial flow compressor which discharges pressurized air to a combustor where fuel is burned to generate a high energy hot gas stream. This gas stream then passes through and drives a turbine which in turn rotates the rotor of the compressor. The remaining energy of the hot gas stream may then be converted to a propulsive force by discharging the gas stream through an exhaust nozzle. A second basic type of engine employs the same combination of compressor, combustor, and turbine as a "core engine." The hot gas stream, however, drives a second turbine which in turn powers a so-called fan or low pressure compressor which pressurizes an air stream which is also discharged through the exhaust nozzle to provide a propulsive force. This latter type of engine is referred to as a turbofan engine.

In both turbofan and turbojet engines, fuel may be burned in the gas or air streams downstream of the turbine and prior to being discharged from the exhaust nozzle to provide additional propulsive force from what is referred to as an afterburner or augmented operation.

Normal operation of the gas turbine engine is generally controlled by a pilot-actuated control lever which, through the engine control systems, sets the rate of fuel flow to the combustor and/or to the afterburner of the engine. This determines the combustion rate and the energy level of the hot gas stream and yields a demanded thrust or energy output from the engine. In the operation of augmented engines, augmentation fuel, $W_{fr}$, is delivered to the engine by the scheduling of a fuel to air ratio (usually in the form of the ratio of fuel to compressor discharge pressure, $P_3$) as a function of this engine control lever input position. Actual fuel is obtained, within the control, by the multiplication of the input reference ($W_{fr}/P_3$) by the measured $P_3$. As the control lever is moved and fuel is increased, the fan discharge pressure increases and the fan duct mach number (downstream of the fan) decreases. This increase in pressure as a result of increase in fuel flow will, if allowed to continue, raise the fan pressure ratio (pressure at fan exit/pressure at inlet) and cause an aerodynamic stall or surge within the fan. In order to preclude this stall, the jet nozzle area must be opened and ideally positioned to maintain the desired fan performance.

Thermodynamic gas turbine cycle studies have shown that the fan duct mach number or corrected fan discharge mass flow, is an ideal parameter to maintain, or schedule, in the augmentation flight region. Hence, it is desirable to sense mach number and to actuate the exhaust nozzle in order to maintain a referenced mach number. Stated in another way, in this type of system augmentation fuel flow establishes a fan duct mach number and the exhaust nozzle is varied to maintain a desired mach number.

This method of scheduling a mach number and controlling the exhaust nozzle area to maintain the mach number, while the augmentation fuel flow is controlled for the desired augmentation thrust, yields excellent engine steady state performance. Problems arise, however, during engine transient conditions. In the described system, $W_{fr}$ is the leading parameter, i.e., the mach number sensor must sense the effect of a change in $W_{fr}$ before it reacts to actuate the exhaust nozzle area. Hence, there must be a change in fan duct mach number before action is taken to restore the mach number to a desired value. If the rate of increase of fuel is high, the lag between the mach number at any time and the desired mach number will increase. Without restraints, this lag could cause a fan stall with fuel flow increases or could cause burner blowout with fuel flow decreases. In order to eliminate this problem, engine performance is normally sacrificed by setting a high mach number reference (low fan pressure ratio) to prevent stall or blowout during transients. In order to assure stall and blowout free transient conditions, presently used controls must include: anticipatory circuits in the mach number control loop to speed the response of the system; rate limits on the fuel control to prevent the fuel flow from leading the area actuation by too large a margin; and means for cutting back on fuel flow if the mach number becomes too low.

It is an object of the present invention, therefore, to provide a control which eliminates the possibility of stall or burner blowout during transient engine operating conditions without the necessity for the above anticipatory circuits, rate limits, etc.

A similar transient problem exists in an augmented turbojet engine. The exhaust nozzle area is generally positioned to maintain a desired turbine temperature. As afterburner or augmenter fuel flow increases, the resultant increase in pressure in the nozzle reduces the work across the turbine, thus causing gas generator RPM to decrease. The main fuel control of the engine senses the decrease in speed and increases main fuel flow to restore the speed. The increase in main fuel flow causes an increase in turbine temperature. The exhaust nozzle area control, sensing the increase in temperature, reacts to increase the nozzle area and restore the desired temperature.

The same lags in response referred to above with respect to a turbofan engine are present in the augmented turbojet engine. Compressor stall usually does not occur, however, because the main fuel control has an acceleration fuel limit protection built into it. Large, undesirable decreases in speed, however, do result; sometimes causing the afterburner to go out and creating relight or cycling problems in the afterburner. It is a further object of this invention, therefore, to provide an augmenter fuel control which eliminates these undesirable decreases in speed and further eliminates afterburner cycling problems.

Many fuel control systems have been developed in an attempt to provide the above objects. One system has been evaluated in which the exhaust nozzle is positioned as a function of the pilot-actuated control lever position. Augmenter fuel flow is then scheduled as a function of the exhaust nozzle position. In this way the augmenter fuel cannot get ahead of the nozzle, but is slave to it, and the problems of fan stall and speed rollback are resolved. Unfortunately, this method does not yield sufficiently accurate engine performance. Mach number (or for a turbojet engine, turbine temperature) is a floating parameter and large variations in thrust and specific fuel consumption will occur over the flight map with such a fuel control system.

It is a final object of this invention, therefore, to provide an augmenter fuel control system wherein the exhaust nozzle area is positioned to maintain a desired mach number (or turbine temperature) and augmenter fuel supply is scheduled by the pilot-actuated control lever position during steady state operation, but wherein augmenter fuel supply is controlled by the exhaust nozzle area during transient operation.

SUMMARY OF THE INVENTION

Briefly stated, the above ends are obtained by the provision of a control system for a turbofan engine or the like, wherein means are provided for sensing the mach number of the flow leaving the fan duct. The system further includes means for sensing the fan inlet temperature, means for generating a desired fan duct mach number therefrom, and further means for generating a mach number error signal. On a steady state basis the exhaust nozzle area is positioned to maintain a desired mach number, and augmenter fuel supply is a function of a pilot-actuated control lever position, as the effects of the mach number error signal on the augmenter fuel supply signal are eliminated by passing the same through an integrator. During transients, augmenter fuel supply is a slave to the exhaust nozzle area position, i.e., it is scheduled as a function of the exhaust nozzle area with slight variations caused by the mach number control.

BRIEF DESCRIPTION OF THE DRAWINGS

The specification concludes with claims particularly pointing out and distinctly claiming the subject matter which the applicant regards as his invention. An understanding of the invention may be gained, however, from the following detailed description of the preferred embodiment, in connection with the accompanying drawings, in which:

FIG. 2 is a similar diagrammatic view of a turbojet engine incorporating applicant's control system.

Figure 1:
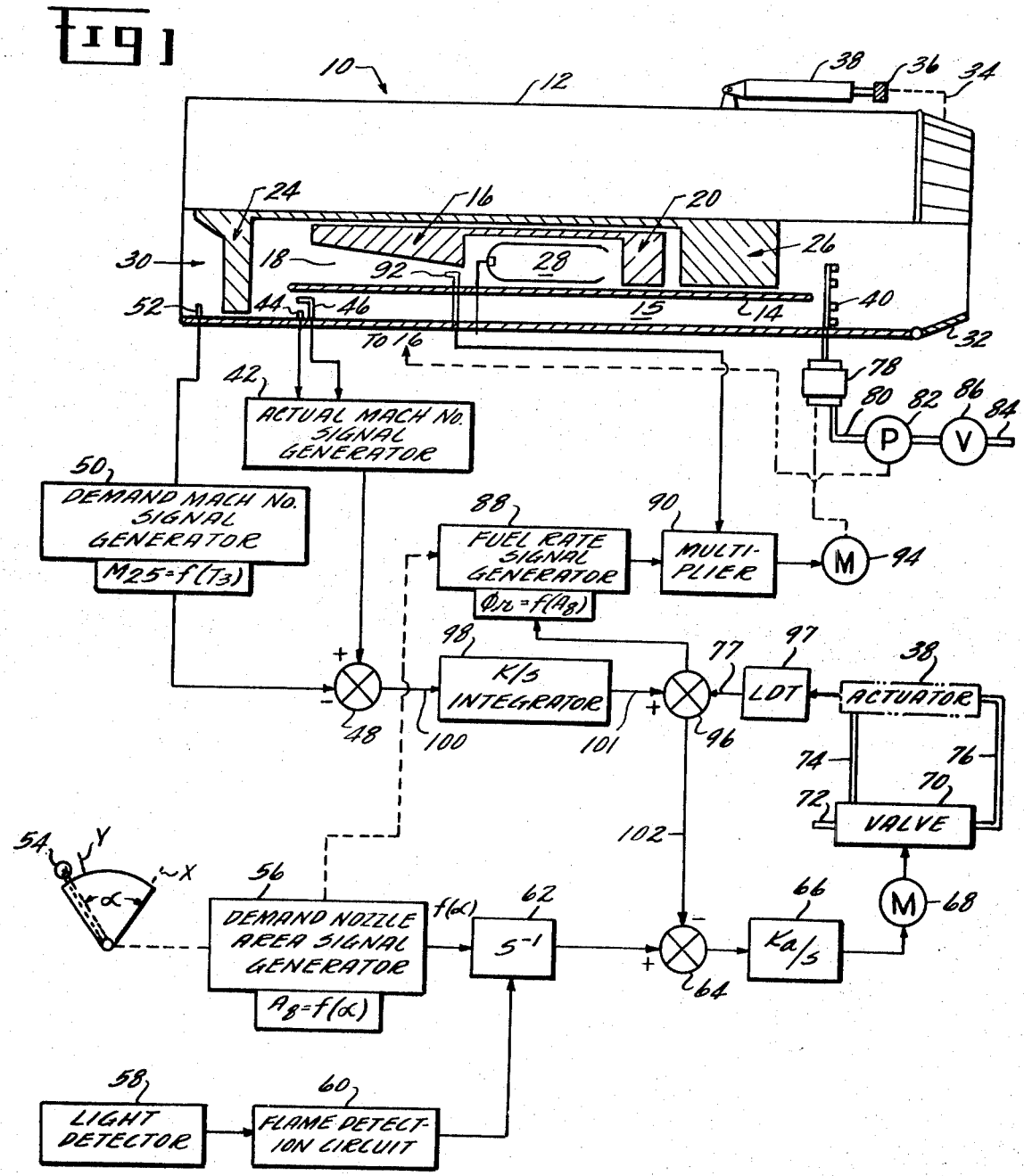
FIG. 1 is a diagrammatic view of a turbofan engine and a control circuit therefor constructed in accordance with the present invention.

Referring first to FIG. 1, a turbofan gas turbine engine 10 is shown schematically with a control system constructed in accordance with the provisions of the present invention. The engine 10 comprises an outer casing 12 and a concentric inner casing 14 forming a fan duct 15 therebetween. A core engine is disposed within the casing 14 and comprises a rotor having at one end a compressor 16, which forms a converging, annular passage 18, and at the other end a turbine 20. The engine further comprises a second rotor having at one end a low pressure compressor or fan 24 and at its opposite end a fan turbine 26 which drives the fan 24. In highly simplified terms, operation of this engine involves compression of an annular air stream by the compressor 16 in the passage 18. Ignition of fuel in a combustor 28 generates a high energy gas stream which first passes through the turbine 20 to drive the core engine compressor 16 and then passes through the fan turbine 26 to drive the fan 24.

Air entering the engine inlet, generally indicated at 30, is initially compressed by the fan 24. A portion of this compressed air enters the core engine to generate the hot gas stream as described above. The remaining portion of the compressed air passes through the fan duct 15. The hot gas stream leaving the combustors 28 first performs work on the turbine 20 to drive the compressor 16 and then performs work on the low pressure turbine 26 to drive the fan 24. The hot gas stream then mixes with the air stream exiting from the fan duct 15 and is discharged through an exhaust nozzle 32 to provide a propulsive force.

To provide a desired propulsive force consistent with other operating parameters, the exhaust nozzle 32 is of the variable area type and comprises a plurality of leaves or fingers which are mechanically interconnected as indicated by the broken line 34 to an actuation ring 36. The actuation ring 36 is longitudinally shifted, relative to the casing 12, by a plurality of system type actuators 38 (only one of which is shown) to increase or decrease the exit area (generally designated A8) of the nozzle 32. The structure described to this point is conventional and is well known to those skilled in the art.

In order to obtain a greater propulsive force, it is also known to burn additional fuel either in the hot gas stream or in the fan duct air stream, or after a mixing of the two streams, prior to its exiting through the exhaust nozzle 32. This is generally referred to as augmented or afterburner operation. In the present embodiment, combustor means in the form of afterburner fuel nozzles 40 are provided in an area downstream of the fan duct 15 to direct fuel to the mixture of gas leaving the fan duct 15 and the low pressure turbine 26.

The present invention is particularly applicable to a control circuit for controlling the rate of afterburner fuel combustion and the area of the exhaust nozzle 32 in a manner which will give highly efficient operation, while minimizing, if not eliminating, the possibility of a stalled condition occurring in the airfoil shaped blades of the fan 24 or of the compressor 16. The control circuit includes a mach number signal generator 42 for producing an output signal indicative of the actual mach number of the gas stream as it is discharged from the fan 24 into the fan duct 15. The signal generator 42 is connected to pressure probes 44 and 46 which respectively measure the static ($P_s$) and total ($P_t$) pressure of the air stream at this point. These pressures are converted into an electrical signal which accurately represents the mach number at this point. The output of the signal generator 42 is a direct function of ($P_t$ $-P_s$) / $P_s$. Such systems for measuring and generating mach signals are well known.

At this point it will be noted that several different signals are to be employed in the present control system. As will be obvious to those skilled in the art, the signals may be in the form of direct current voltages having the proper polarity and magnitude for the stated functions. It should also be obvious that other types of signals may be substituted for the above and could perform the same stated functions.

The actual mach number signal is compared at a summation point 48 with a desired or demand mach number signal provided by a demand mach number signal generator 50. The signal generator 50 provides a signal reflecting a desired mach number at the fan exit as a function of the temperature of the air entering the engine, which in turn reflects the corrected speed of rotation of the fan due to action of the core engine fuel control which is controlling core fuel flow to maintain desired fan speed. To this end, there is a connection from a temperature sensor 52, disposed at the fan inlet, to the signal generator 50. Signal generator 50 may be of the well-known diode function generator type which provides an output voltage having a predetermined relationship to the fan inlet temperature and an assumed constant fan speed. (The fan speed may be assumed to be constant by virtue of the fact that fan speed is controlled in the main fuel portion of the control system, as previously mentioned.) The summation point 48 and other summation points hereinafter referred to may be of the operational amplifier type to provide an output which is a mathematical summation of the input thereto, taking into account both the magnitude and polarity of these inputs.

EXHAUST NOZZLE AREA CONTROL

In the present circuit, the exit area of the exhaust nozzle 32 is controlled as a function of the position of a pilot-actuated control lever 54 by a mechanical connection from the lever 54 to a demand nozzle area signal generator 56. The signal generator 56 may be of known construction and provides an output indicative of a desired area, with the desired area being a direct function of the control lever position. In addition, the control lever 54 controls the amount of fuel delivered to the main combustors 28 by the main fuel control (not shown and not directly related to the present invention).

When it is desired to initiate afterburner or augmented operation, the throttle lever 54 is displaced beyond a certain position (position Y, for example) and the following sequence occurs. The nozzle area signal generator 56 demands a fully open exhaust nozzle area. A light detector 58, however, in combination with flame detection circuit 60 prevents opening of the exhaust nozzle area beyond a preset value until ignition of the afterburner is detected. The flame detection circuit 60 may consist of a simple logic circuit including a minimum selector 62 which prevents the exhaust area from opening until the light detector 58 observes a flame, at which time the logic circuit exerts a signal upon the minimum selector (which could consist of a simple AND gate), which will then permit the required scheduling of the exhaust nozzle area as demanded by the signal generator 56.

The output signal from the minimum selector 62 passes next to a summation point 64 and then to a simplified transfer function 66, the output of which acts as a control signal to a torque motor 68 which positions a four-way valve 70. The valve 70 is connected to a source of pressurized hydraulic fluid by a conduit 72 and has output 74 and 76, respectively connected to the head and rod ends of the actuators 38 (one of which is shown repetitiously in phantom). The valve 70 properly directs fluid to the actuator 38 to displace the actuation ring 36 in a direction either increasing or decreasing the exit area of the nozzle 32 depending upon the magnitude and polarity of the control signal. As shown, the nozzle actuation system is an integrating closed loop control as represented by the simplified transfer function 66 and an exhaust nozzle area signal feedback path, which will be described in some detail later.

AUGMENTER FUEL CONTROL

Fuel flow to the afterburner fuel nozzles 40 is controlled by a metering valve 78. This metering valve is connected by a conduit 80 to a pressurizing pump 82, which is preferably of the centrifugal type and is driven by a mechanical connection to the core engine compressor rotor 16. The pump 82 is connected to a suitable source of fuel by a conduit 84 having a valve 86 interposed therein.

As previously discussed, it is desirable to control the augmenter fuel control rate by the position of the pilot-actuated control lever 54 during steady state operation and to have the fuel rate scheduled or limited as a function of the exhaust nozzle area during transient operation. The above ends are accomplished by use of the following control circuit.

$\Phi_r$ (Augmenter fuel flow/compressor discharge pressure) is scheduled as a function of the exhaust nozzle area position signal, biased by a mach number signal, as shown schematically by a fuel rate signal generator 88. The $\Phi_r$ signal is next multiplied in a multiplier 90, by the compressor discharge pressure (as sensed by a sensor 92) to obtain a signal representative of the desired fuel rate. This signal controls the operation of a torque motor 94 which, in turn, controls the output of the valve 78. The input signal to the fuel rate signal generator 88 is generated at a summation point 96, the purpose of which will presently become apparent.

Looking at the summation point 96, and neglecting for a moment the mach number error signal, it can be seen that $\Phi_r$ is a function of the exhaust nozzle area position due to an input signal 77, which forms a part of the exhaust nozzle area signal feedback loop and accurately reflects the actual exhaust nozzle position. A potentiometer or linear differential transformer (LDT) 97 can be used to provide a voltage which is indicative of nozzle position. The LDT 97 is normally excited by a controlled frequency with an output voltage as a function of position. The output is demodulated to get a d.c. voltage as a function of position.

MACH NUMBER CONTROL

The mach number error signal accomplishes the following. As previously discussed, the desired mach number is generated as a function of the fan inlet temperature and is compared with the actual mach number at the summation point 48. The error signal 100 (difference between the reference and the actual) is integrated through an integrator [K/S] 98, and the output of the integrator is added to the actual exhaust nozzle position at the summation point 96, as shown schematically by an input lead 101. This results in an actual $\Phi_r$ of: $\Phi_r = F(A_8) + \int (M_{25} \text{ reference} - M_{25}) dt$; where $A_8$ = actual exit area of exhaust nozzle 32, and where $M_{25}$ = mach number within the fan duct.

Under steady state conditions, the mach number error (input lead 100) must be zero due to the operation of the integrator 98. The result of this integration is that the mach number control modifies the exhaust nozzle area signal through an input 102 to the summation point 64 to obtain zero mach number error. This results in the following: $\Phi_r = F(\alpha)$ [steady state operation]. This result can be shown mathematically as follows: the input to the transfer function 66 is the error signal of $f(\alpha) - [A_8 + \int (M_{25} \text{ reference} - M_{25}) dt$. Because of the integrator 66 this error signal must be zero under steady state conditions. Hence, $f(\alpha) - [A_8 + \int M_{25} \text{ reference} - M_{25}) dt]$ = 0 (steady state). From the above, $f(\alpha) - \Phi_r = 0$, or $\Phi_r = f(\alpha)$ (steady state).

The compensated feedback system which has just been described has thus performed the unique function of meeting both the desirable steady state and transient performance conditions previously discussed. That is, during steady state operation, the mach number of the flow leaving the fan 24 is controlled by positioning the exhaust nozzle area 32; and afterburner fuel flow is controlled by the position of the pilot-actuated control lever 54 [$\Phi_r = f(\alpha)$]. During transients, however, the afterburner fuel rate is scheduled as a function of the exhaust nozzle area 32 with slight variations caused by the mach number control [$\Phi_r = f(A_8) + \int (M_{25} \text{ref} - M_{25}) dt$].

These variations are minimal and corrective. During steady state operation the desired fuel flow is a function of $\alpha$ which is also equal to the algebraic sum of the $A_8$ position and mach number circuit output. Hence, we have a zero error position. During a transient we are starting from the desirable $A_8$ position. In other words, the mach number has reset $A_8$ to give the desirable relationship of $A_8$ with $W_{fr}$. At the initiation of the transient, $A_8$ begins to open and starts to increase the fuel flow from the zero error initial condition. Mach number only changes to compensate for the tracking error between $A_8$ and $W_{fr}$. The control system therefore tends to give better transient accuracy. The described system thus eliminates the need for rate limits throughout the system while significantly reducing stall (or speed rollback) problems.

While the system has been shown incorporated within a turbofan type engine, it is easily adaptable to use with an augmented turbojet engine, such as the one schematically shown and designated by the numeral 150 in FIG. 2. The turbojet engine 150 consists of a compressor 152, a combustion system 154, a turbine 156, a tail pipe 158 which includes an augmenter system 160, and a variable area exhaust nozzle 162. Many of the elements of the control system shown in FIG. 2 are identical to those shown in FIG. 1 and are therefore given identical numerals.

In the illustrated system, a turbine exhaust temperature control would replace the fan mach number control. That is, the demand mach number signal generator 50 and the actual mach number signal generator 42 would be replaced by a demand turbine temperature signal generator 200 and an actual turbine temperature signal generator 202, respectively. (Turbine inlet or outlet temperature could be utilized). An error signal 204 between actual and demand temperature thus generated would be integrated by an integrator 206 and would again be coupled at a summation point 208 with the exhaust nozzle area feedback loop, generally designated 210, which includes identical elements to those shown in FIG. 1. The resulting signal would be utilized to control the augmenter (afterburner) fuel rate signal generator 212. The remaining portions of the circuit would operate similarly to those described with respect to FIG. 1. Such a system would result in steady state and transient operations for the turbojet engine identical with those described above for the turbofan engine.

Use of the above described system provides a number of advantages. For example, the system permits decreased allowance for transient stall margin within the engine. The system reduces the probability of compressor stall or of speed rollback. The system provides outstanding steady state performance with a simplified control which eliminates rate limits and anticipatory circuits utilized in present day controls. Finally, the system is readily adaptable for use with turbojet and turbofan engines.

What is claimed as new and desired to be secured by Letters Patent of the United States is:

1. In a gas turbine engine of the turbofan type including a fan, a low pressure turbine for driving the fan, and a core engine with an axial flow compressor, a primary combustion system, a turbine for driving the compressor, an augmenter combustion system, a variable area exhaust nozzle, a fan duct surrounding the core engine, and a pilot-actuated control lever:

a control system for varying the amount of fuel delivered to the augmenter combustion system and for varying the exhaust nozzle area, said control system comprising:

means for scheduling the mach number ($M_{ref}$) of the gas flow at a certain point within said gas turbine engine;

means for determining the actual mach number ($M$) of the gas flow at said point, and means for generating an error signal reflecting the difference between said scheduled and said actual mach numbers;

means for integrating said error signal;

means for summing the integral of said error signal and said actual exhaust nozzle area signal; and means for coupling said summation signal to said augmenter fuel rate signal generating means and to said exhaust nozzle area signal generating means such that during steady state operation the exhaust nozzle area accurately controls said temperature, and the position of said control lever determines the augmenter fuel control delivery rate, while during transient operation said exhaust nozzle area controls the augmenter fuel delivery rate.

2. The control system of claim 1 wherein said augmenter fuel rate signal generating means generates a signal such that augmenter fuel flow is a function of the exhaust nozzle area.

3. The control system of claim 2 wherein said exhaust nozzle area signal generating means generates a signal such that the exhaust nozzle area is a function of the control lever position.

4. The control system of claim 3 wherein the signal generated by said augmenter fuel rate signal generating means, when coupled with said summation signal, yields an augmenter fuel flow which is a function of the exhaust nozzle area corrected by the integral of the error signal.

5. The control system of claim 4 wherein said integrating means is positioned between said error signal generating means and said summing means such that, during steady state operations, the augmenter fuel flow is a function solely of the control lever position.

6. The control system of claim 5 further characterized by the fact that said integrated error signal forms a part of an $A_8$ feedback loop such that, in the steady state condition the exhaust nozzle area is positioned to maintain a desired mach number.

7. A control system for varying the amount of fuel delivered to an augmenter of a gas turbine engine, said system comprising:

means for generating an augmenter fuel delivery rate signal as a function of the gas turbine exhaust nozzle area;

means for generating a desired gas turbine exhaust nozzle area signal as a function of the position of a pilot-actuated control lever;

means for generating an actual exhaust nozzle area signal;

means for scheduling the mach number of the gas flow at a certain point within said gas turbine engine as a function of the temperature of the gas entering said gas turbine engine;

means for determining the actual mach number of said gas flow at said point and means for generating an error signal between said scheduled mach number and said actual mach number;

means for integrating said error signal;

means for summing the integral of said error signal and said actual exhaust nozzle area signal; and means for coupling said summation signal to said augmenter fuel rate signal generating means and to said exhaust nozzle area signal generating means such that during steady state operation the exhaust nozzle area accurately controls said mach number, and the position of said control lever determines the augmenter fuel control delivery rate, while during transient operation said exhaust nozzle area controls the augmenter fuel delivery rate.

8. A control system for varying the amount of fuel delivered to an augmenter of a gas turbine engine, said system comprising:

means for generating an augmenter fuel delivery rate signal as a function of the gas turbine exhaust nozzle area;

means for generating a desired gas turbine exhaust nozzle area signal as a function of the position of a pilot-actuated control lever;

means for generating an actual exhaust nozzle area signal;

means for scheduling the temperature of the gas at a certain point within said gas turbine engine;

means for determining the actual temperature of the gas at said point and means for generating an error signal between said scheduled temperature and said actual temperature;

means for integrating said error signal;

means for generating an augmenter fuel rate signal;

means for generating a desired exhaust nozzle area signal;

means for positioning said exhaust nozzle in response to said exhaust nozzle area signal and for generating an actual exhaust nozzle area position signal;

means for summing the integral of said error signal and said actual area position signal; and means for applying said summation signal to both said area signal generating means and to said augmenter fuel rate signal generating means.

9. A control system as recited in claim 8 wherein the temperature scheduled and controlled is turbine inlet temperature.

10. A control system as recited in claim 8 wherein the temperature scheduled and controlled is turbine exhaust temperature.

* * * * *

PO-1050
(5/69)

UNITED STATES PATENT OFFICE
CERTIFICATE OF CORRECTION

Patent No. 3,656,301               Dated    April 18, 1972

Inventor(s)         Herbert Katz                          -1-

It is certified that error appears in the above-identified patent and that said Letters Patent are hereby corrected as shown below:

Column 7, lines 25 through 35, and Column 8, lines 43 through 52 have been reversed. The following is the correct form of claims 1 and 8:

1. In a gas turbine engine of the turbofan type including a fan, a low pressure turbine for driving the fan, and a core engine with an axial flow compressor, a primary combustion system, a turbine for driving the compressor, an augmenter combustion system, a variable area exhaust nozzle, a fan duct surrounding the core engine, and a pilot-actuated control lever:

a control system for varying the amount of fuel delivered to the augmenter combustion system and for varying the exhaust nozzle area, said control system comprising:

means for scheduling the mach number ($M_{ref}$) of the gas flow at a certain point within said gas turbine engine;

means for determining the actual mach number (M) of the gas flow at said point, and means for generating an error signal reflecting the difference between said scheduled and said actual mach numbers;

means for integrating said error signal;

means for generating an augmenter fuel rate signal;

means for generating a desired exhaust nozzle area signal;

means for positioning said exhaust nozzle in response to said exhaust nozzle area signal and for generating an actual exhaust nozzle area position signal;

means for summing the integral of said error signal and said actual area position signal; and means for applying said summation signal to both said area signal generating means and to said augmenter fuel rate signal generating means.

UNITED STATES PATENT OFFICE
CERTIFICATE OF CORRECTION

Patent No. 3,656,301         Dated  April 18, 1972

Inventor(s)    Herbert Katz                                    -2-

It is certified that error appears in the above-identified patent and that said Letters Patent are hereby corrected as shown below:

8. A control system for varying the amount of fuel delivered to an augmenter of a gas turbine engine, said system comprising:
    means for generating an augmenter fuel delivery rate signal as a function of the gas turbine exhaust nozzle area;
    means for generating a desired gas turbine exhaust nozzle area signal as a function of the position of a pilot-actuated control lever;
    means for generating an actual exhaust nozzle area signal;
    means for scheduling the temperature of the gas at a certain point within said gas turbine engine;
    means for determining the actual temperature of the gas at said point and means for generating an error signal between said scheduled temperature and said actual temperature;
    means for integrating said error signal;
    means for summing the integral of said error signal and said actual exhaust nozzle area signal; and
    means for coupling said summation signal to said augmenter fuel rate signal generating means and to said exhaust nozzle area signal generating means such that during steady state operation the exhaust nozzle area accurately controls said temperature, and the position of said control lever determines the augmenter fuel control delivery rate, while during transient operation said exhaust nozzle area controls the augmenter fuel delivery rate.

Signed and sealed this 6th day of March 1973.

(SEAL)
Attest:

EDWARD M. FLETCHER, JR.                    ROBERT GOTTSCHALK
Attesting Officer                          Commissioner of Patents